United States Patent
Baldridge

(10) Patent No.: US 9,871,372 B2
(45) Date of Patent: Jan. 16, 2018

(54) VOLTAGE BUS PROTECTION AND ISOLATION DEVICE

(71) Applicant: Micropac Industries, Inc., Garland, TX (US)

(72) Inventor: Wayne Baldridge, Garland, TX (US)

(73) Assignee: MICROPAC INDUSTRIES, INC., Garland, TX (US)

( * ) Notice: Subject to any disclaimer, the term of this patent is extended or adjusted under 35 U.S.C. 154(b) by 257 days.

(21) Appl. No.: 14/925,304

(22) Filed: Oct. 28, 2015

(65) Prior Publication Data

US 2016/0372915 A1 Dec. 22, 2016

Related U.S. Application Data

(60) Provisional application No. 62/060,768, filed on Oct. 7, 2014.

(51) Int. Cl.
*H02H 3/00* (2006.01)
*H02H 3/20* (2006.01)
*H02H 3/24* (2006.01)

(52) U.S. Cl.
CPC .............. *H02H 3/20* (2013.01); *H02H 3/24* (2013.01)

(58) Field of Classification Search
CPC ........................................................ H02H 3/20
USPC ............................................................ 361/65
See application file for complete search history.

(56) References Cited

U.S. PATENT DOCUMENTS

| | | |
|---|---|---|
| 3,660,724 A | 5/1972 | Berger |
| 3,697,861 A | 10/1972 | Frazier |
| 3,714,511 A | 1/1973 | Fendrich, Jr. |
| 4,241,372 A | 12/1980 | Sears |
| 4,462,069 A | 7/1984 | Becky |
| 4,847,720 A | 7/1989 | Dezonno |
| 4,871,971 A * | 10/1989 | Jeerings ................. G01R 25/00 324/509 |
| 5,291,365 A | 3/1994 | Takagi |
| 5,570,276 A | 10/1996 | Cuk et al. |
| 6,137,699 A | 10/2000 | Sakamoto |
| 6,288,883 B1 | 9/2001 | Chen |
| 6,515,840 B2 * | 2/2003 | Covi ...................... H02H 3/087 361/93.1 |
| 6,548,992 B1 | 4/2003 | Alcantar et al. |

(Continued)

*Primary Examiner* — Stephen W Jackson
(74) *Attorney, Agent, or Firm* — Daniel J. Chalker; Edwin S. Flores; Chalker Flores, LLP

(57) ABSTRACT

A voltage bus protection/isolation device includes voltage input and output terminals, a disconnect circuit connected between the voltage input and output terminals, a voltage monitoring circuit connected to the voltage input terminal, a resistive circuit connected between a first and second return terminals, a current squared time monitoring circuit connected to the resistive circuit, a control circuit connected, and a fault latch circuit connected to the monitoring circuits, the disconnect circuit and the control circuit. The fault latch circuit: turns the disconnect circuit "OFF" thereby isolating the voltage input terminal from the voltage output terminal whenever the monitoring circuits detect an over voltage condition, an under voltage condition or an overload condition, or an "OFF" signal is received from the control circuit; and turns the disconnect circuit "ON" thereby connecting the voltage input terminal to the voltage output terminal whenever an "ON" signal is received from the control circuit.

28 Claims, 3 Drawing Sheets

(56) References Cited

U.S. PATENT DOCUMENTS

| | | | |
|---|---|---|---|
| 6,972,940 B2 | 12/2005 | Tsukasaki et al. | |
| 8,335,065 B2 | 12/2012 | Smith | |
| 8,482,894 B2 | 7/2013 | Yra et al. | |
| 8,958,956 B1* | 2/2015 | Felps | B66D 3/26 |
| | | | 254/362 |
| 9,702,910 B2* | 7/2017 | Baldridge | G01R 21/06 |
| 2007/0014066 A1* | 1/2007 | Ye | H02H 6/005 |
| | | | 361/100 |
| 2013/0057241 A1* | 3/2013 | Shuvalov | H03K 17/122 |
| | | | 323/271 |
| 2014/0029152 A1* | 1/2014 | Mazzola | H03K 17/6871 |
| | | | 361/115 |
| 2014/0218200 A1* | 8/2014 | Chen | H02J 7/0036 |
| | | | 340/644 |

* cited by examiner

US 9,871,372 B2

VOLTAGE BUS PROTECTION AND ISOLATION DEVICE

PRIORITY CLAIM AND RELATED APPLICATION DATA

This application is a non-provisional application of U.S. provisional patent application No. 62/060,768, filed on Oct. 7, 2014 which application is hereby incorporated by reference in its entirety.

STATEMENT OF FEDERALLY FUNDED RESEARCH

Not Applicable.

TECHNICAL FIELD OF THE INVENTION

The present invention relates in general to bus protection for a voltage bus supply system providing a current to a specified load which is continually monitored and limited to a safe level.

BACKGROUND OF THE INVENTION

In prior art, the circuit functionality did not provide scalable operation to higher voltages while providing a continuous feature set and capabilities, thereby limiting the application space of the circuit device. Thus, there are existing deficiencies associated with supply bus protection devices.

SUMMARY OF THE INVENTION

The present invention protects the supply bus from an inoperable condition resulting from a partial or catastrophic failure of a bus supplied circuit. In addition, the operational space of the present invention is scalable with respect to the bus application voltage, current and power. The present invention may also include new features such as (1) supply bus disconnect, (2) master reset, (3) supply bus input current limit, (4) supply bus input power limit, and (5) additional circuitry consisting of and providing for multi functions. Moreover, the present invention provides supply bus power limiting based on established voltage and current operating points.

One embodiment of the present invention provides a voltage bus protection and isolation device having a bus supply voltage input terminal, a bus supply voltage output terminal, a bus supply disconnect circuit connected between the bus supply voltage input terminal and the bus supply voltage output terminal, a voltage monitoring circuit connected to the bus supply voltage input terminal, a resistive circuit connected between a first bus supply return terminal and a second bus supply return terminal, a current squared time ($I^2t$) monitoring circuit connected to the resistive circuit, a control circuit connected to a control terminal, and a fault latch circuit. The fault latch circuit is connected to the voltage monitoring circuit, the bus supply disconnect circuit, the current squared time ($I^2t$) monitoring circuit and the control circuit. In addition, the fault latch circuit: (a) turns the bus supply disconnect circuit "OFF" thereby isolating the bus supply voltage input terminal from the bus supply voltage output terminal whenever the voltage monitoring circuit detects an over voltage condition, the voltage monitoring circuit detects an under voltage condition, the current squared time ($I^2t$) monitoring circuit detects an overload condition or an "OFF" signal is received from the control circuit, and (b) turns the bus supply disconnect circuit "ON" thereby connecting the bus supply voltage input terminal to the bus supply voltage output terminal whenever an "ON" signal is received from the control circuit.

Another embodiment of the present invention provides voltage bus protection and isolation device having a bus supply voltage input terminal, a bus supply voltage output terminal, a bus supply disconnect circuit connected between the bus supply voltage input terminal and the bus supply voltage output terminal, a gate drive circuit connected to the supply bus disconnect circuit, an over voltage monitoring circuit connected to the bus supply voltage input terminal, an under voltage monitoring circuit connected to the bus supply voltage input terminal, a resistive circuit connected between a first bus supply return terminal and a second bus supply return terminal, a current sensing circuit connected to the resistive circuit, a current squared time ($I^2$) comparison circuit connected to the current sensing circuit, a control circuit connected to a control terminal, a fault latch circuit and a data process monitoring circuit. The fault latch circuit is connected to the over voltage monitoring circuit, the under voltage monitoring circuit, the gate drive circuit, the current squared time ($I^2$) comparison circuit and the control circuit. In addition, the fault latch circuit: (a) turns the bus supply disconnect circuit "OFF" via the gate drive circuit thereby isolating the bus supply voltage input terminal from the bus supply voltage output terminal whenever the over voltage monitoring circuit detects an over voltage condition, the under voltage monitoring circuit detects an under voltage condition, the current squared time ($I^2t$) comparison circuit detects an overload condition or an "OFF" signal is received from the control circuit, and (b) turns the bus supply disconnect circuit "ON" via the gate drive circuit thereby connecting the bus supply voltage input terminal to the bus supply voltage output terminal whenever an "ON" signal is received from the control circuit. The data process monitoring circuit is connected to the over voltage monitoring circuit, the under voltage monitoring circuit, the fault latch circuit, the current sensing circuit, the bus supply voltage output terminal, the second bus supply return terminal and one or more data terminals.

Yet another embodiment of the present invention provides a method for protecting and isolating a voltage bus by providing a device having a bus supply voltage input terminal, a bus supply voltage output terminal, a bus supply disconnect circuit connected between the bus supply voltage input terminal and the bus supply voltage output terminal, a voltage monitoring circuit connected to the bus supply voltage input terminal, a resistive circuit connected between a first bus supply return terminal and a second bus supply return terminal, a current squared time ($I^2t$) monitoring circuit connected to the resistive circuit, a control circuit connected to a control terminal, and a fault latch circuit connected to the voltage monitoring circuit, the bus supply disconnect circuit, the current squared time ($I^2t$) monitoring circuit and the control circuit. An input supply voltage is measured using the voltage monitoring circuit. A current squared time ($I^2t$) value based on a current across the resistive circuit is measured using the current squared time ($I^2t$) monitoring circuit. The bus supply disconnect circuit is automatically turned "OFF" using the fault latch circuit thereby isolating the bus supply voltage input terminal from the bus supply voltage output terminal whenever the voltage monitoring circuit detects an over voltage condition, the voltage monitoring circuit detects an under voltage condition, the current squared time ($I^2t$) monitoring circuit detects an overload condition or an "OFF" signal is received from the control circuit. The bus supply disconnect circuit is automatically turned "ON" using the fault latch circuit thereby connecting the bus supply voltage input terminal to the bus supply voltage output terminal whenever an "ON" signal is received from the control circuit.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
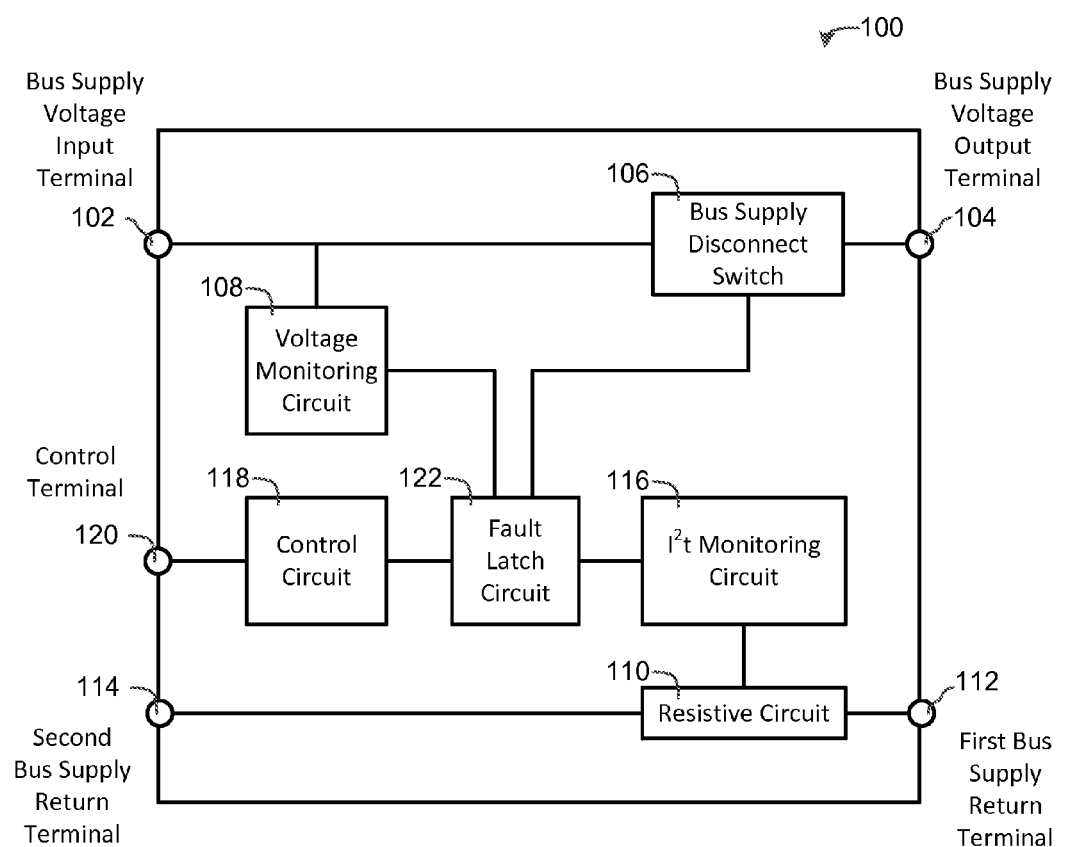
FIG. 1 is a device block diagram in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. The terminology herein is used to describe specific embodiments of the invention, but their usage does not delimit the invention, except as outlined in the claims.

Referring to the drawings, wherein like reference numerals designate identical or corresponding parts throughout the several views the preferred embodiments of the present invention are described. This invention may, however, be embodied in many different forms and should not be construed as limited to the embodiment set forth herein.

Recent applications using increasing levels of bus supply voltages have elevated the need to protect the bus supply from decreased capacity or loss of the bus due to soft and hard shorts related to circuit elements operating on the supply bus. The bus voltage range of the bus may vary largely in application; therefore requiring the electronic bus protection device described herein to be scalable to the bus supply for both voltage and current.

Device scalability may encompass input bus supply voltages from low to high voltages with full continuity in operation. Likewise, the device can accommodate a wide range of current limits. The operational point for a current limit is determined by monitoring and adjusting the circuit values to a specific current limit. The circuits described herein, however, may be constructed such that they are customized to a specific level of input bus supply voltage as well as a specific level of current for the input supply voltage with defined narrow tolerance(s).

Now referring to FIG. 1, a voltage bus protection and isolation device 100 in accordance with one embodiment of the present invention is shown. The voltage bus protection and isolation device 100 includes a bus supply voltage input terminal 102, a bus supply voltage output terminal 104, a bus supply disconnect circuit 106 connected between the bus supply voltage input terminal 102 and the bus supply voltage output terminal 104, a voltage monitoring circuit 108 connected to the bus supply voltage input terminal 102, a resistive circuit 110 connected between a first bus supply return terminal 112 and a second bus supply return terminal 114, a current squared time ($I^2t$) monitoring circuit 116 connected to the resistive circuit 110, a control circuit 118 connected to a control terminal 120, and a fault latch circuit 122 connected to the voltage monitoring circuit 108, the bus supply disconnect circuit 106, the current squared time ($I^2t$) monitoring circuit 116 and the control circuit 118. The fault latch circuit 112: (a) turns the bus supply disconnect circuit 106 "OFF" thereby isolating the bus supply voltage input terminal 102 from the bus supply voltage output terminal 104 whenever the voltage monitoring circuit 108 detects an over voltage condition, the voltage monitoring circuit 108 detects an under voltage condition, the current squared time ($I^2t$) monitoring circuit 116 detects an overload condition or an "OFF" signal is received from the control circuit 118, and (b) turns the bus supply disconnect circuit 106 "ON" thereby connecting the bus supply voltage input terminal 102 to the bus supply voltage output terminal 104 whenever an "ON" signal is received from the control circuit 118.

The control circuit 118 may also automatically sends the "ON" signal to the fault latch circuit 122 after a time delay from the fault latch circuit 122 turning the bus supply disconnect circuit 106 "OFF" in response to the over voltage condition, the under voltage condition, or the overload condition. Note that one or more parameters defining at least one of the over voltage condition, the under voltage condition, or the overload condition can be programmable.

The voltage monitoring circuit 108 monitors an input supply voltage, detects the over voltage condition by comparing the input supply voltage to an over voltage set value, and detects the under voltage condition by comparing the input supply voltage to an under voltage set value. The voltage monitoring circuit 108 may include an over voltage monitoring circuit and an under voltage monitoring circuit. In such a case, the over voltage monitoring circuit monitors an input supply voltage and detects the over voltage condition by comparing the input supply voltage to an over voltage set value, and the under voltage monitoring circuit monitors the input supply voltage and detects the under voltage condition by comparing the input supply voltage to an under voltage set value. The over voltage set value and the under voltage set value may also be programmable.

The current squared time ($I^2t$) monitoring circuit 116 may include a current sensing circuit connected to the resistive circuit 110, and a current squared time ($I^2t$) comparison circuit connected to the current sensing circuit and the fault latch circuit 122. In such a case, the current sensing circuit detects a current using the resistive circuit 110, and provides a voltage signal proportional to a current squared time ($I^2t$) value to the current squared time ($I^2t$) comparison circuit. The current squared time ($I^2t$) comparison circuit detects the overload condition by comparing the voltage signal to one or more preset values with or without a time delay. The one or more preset values and the time delay may also be programmable.

Other device components may include: a gate drive circuit connected between the fault latch circuit 122 and the supply bus disconnect circuit 106; a latch status terminal connected to the fault latch circuit 122; and/or a data process monitoring circuit connected to the voltage monitoring circuit 108, the fault latch circuit 122, the current squared time ($I^2t$) monitoring circuit 116, the bus supply voltage output terminal 104, the second bus supply return terminal 112 and one or more data terminals. The one or more data terminals may include at least one of an over voltage status terminal, an under voltage status terminal, a bus supply voltage good terminal, a load current terminal, a load voltage terminal, or any other desirable condition status terminal.

Figure 2:
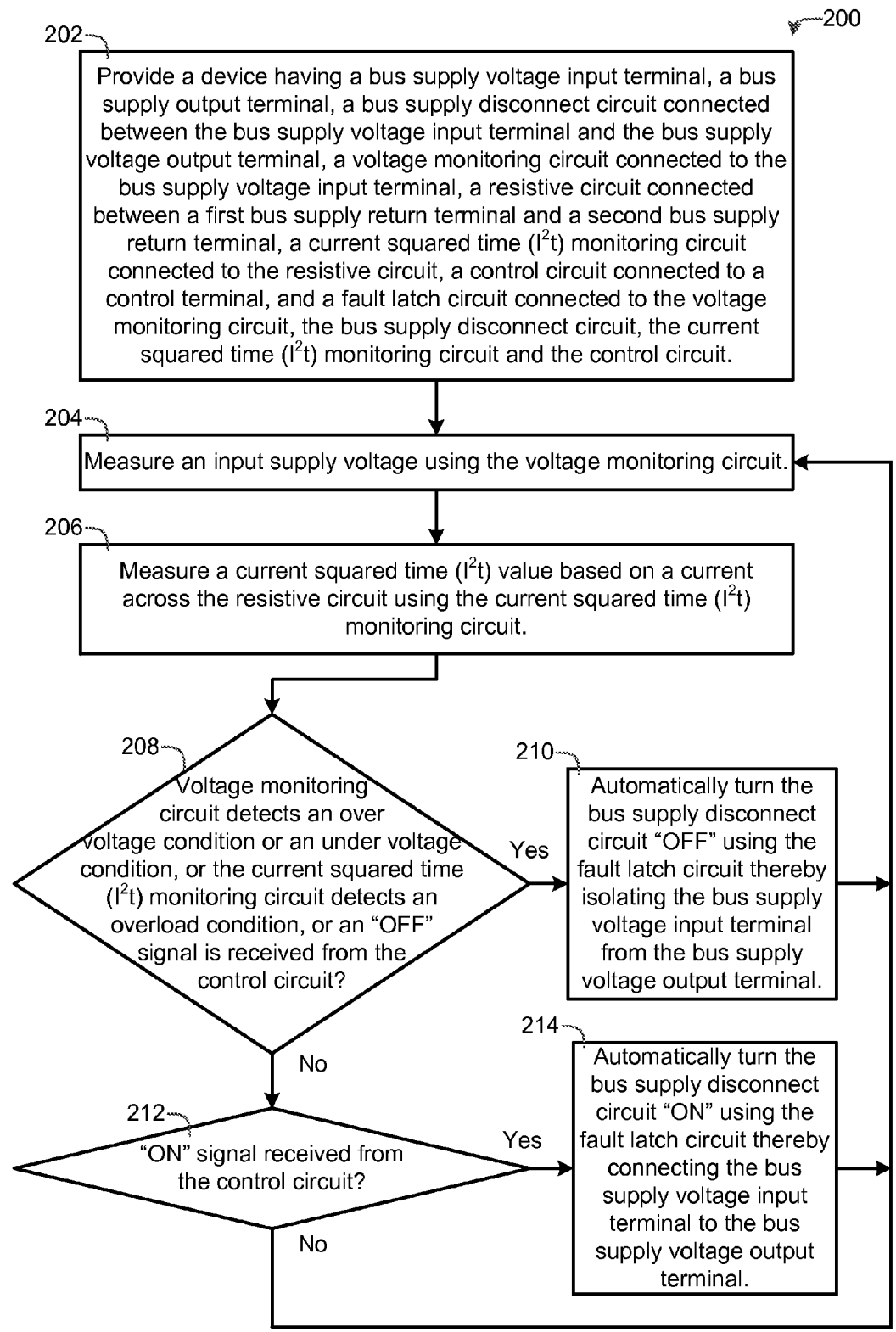
FIG. 2 is a flow chart of a method in accordance with one embodiment of the present invention.

Referring now to FIG. 2, a method 200 for protecting and isolating a voltage bus is shown. A device is provided in block 202. The device may include a bus supply voltage input terminal, a bus supply voltage output terminal, a bus supply disconnect circuit connected between the bus supply voltage input terminal and the bus supply voltage output terminal, a voltage monitoring circuit connected to the bus supply voltage input terminal, a resistive circuit connected between a first bus supply return terminal and a second bus supply return terminal, a current squared time ($I^2t$) monitoring circuit connected to the resistive circuit, a control circuit connected to a control terminal, and a fault latch circuit connected to the voltage monitoring circuit, the bus supply disconnect circuit, the current squared time ($I^2t$) monitoring circuit and the control circuit. Various non-limiting examples of such a device are shown and described in reference to FIGS. 1 and 3.

An input supply voltage is measured using the voltage monitoring circuit in block 204. A current squared time ($I^2t$) value based on a current across the resistive circuit is measured using the current squared time ($I^2t$) monitoring circuit in block 206. If, as determined in decision block 208, the voltage monitoring circuit detects an over voltage condition, the voltage monitoring circuit detects an under voltage condition, the current squared time ($I^2t$) monitoring circuit detects an overload condition or an "OFF" signal is received from the control circuit: the bus supply disconnect circuit is automatically turned "OFF" using the fault latch circuit thereby isolating the bus supply voltage input terminal from the bus supply voltage output terminal in block 210; and the process loops back to block 204 and repeats as previously described. If, however, the conditions specified in decision block 208 are not satisfied, and an "ON" signal is received from the control circuit as determined in decision block 212: the bus supply disconnect circuit is automatically turned "ON" using the fault latch circuit thereby connecting the bus supply voltage input terminal to the bus supply voltage output terminal in block 214; and the process loops back to block 204 and repeats as previously described. If, however, the conditions specified in decision block 212 are not satisfied, the process loops back to block 204 and repeats as previously described.

Other steps may include: automatically sending the "ON" signal to the fault latch circuit from the control circuit after a time delay from the fault latch circuit turning the bus supply disconnect circuit "OFF" in response to the over voltage condition, the under voltage condition, or the overload condition; and/or programming one or more parameters defining at least one of the over voltage condition, the under voltage condition, or the overload condition.

The voltage monitoring circuit may detect the over voltage condition by comparing the input supply voltage to an over voltage set value, and detect the under voltage condition by comparing the input supply voltage to an under voltage set value. The voltage monitoring circuit may include separate over voltage monitoring and an under voltage monitoring circuits. Similarly, the current squared time ($I^2t$) monitoring circuit may include a current sensing circuit connected to the resistive circuit, and a current squared time ($I^2t$) comparison circuit connected to the current sensing circuit and the fault latch circuit. In such a case, the current sensing circuit detects the current using the resistive circuit, and provides a voltage signal proportional to a current squared time ($I^2t$) value to the current squared time ($I^2t$) comparison circuit. The current squared time ($I^2t$) comparison circuit detects the overload condition by comparing the voltage signal to one or more preset values with or without a time delay.

Figure 3:
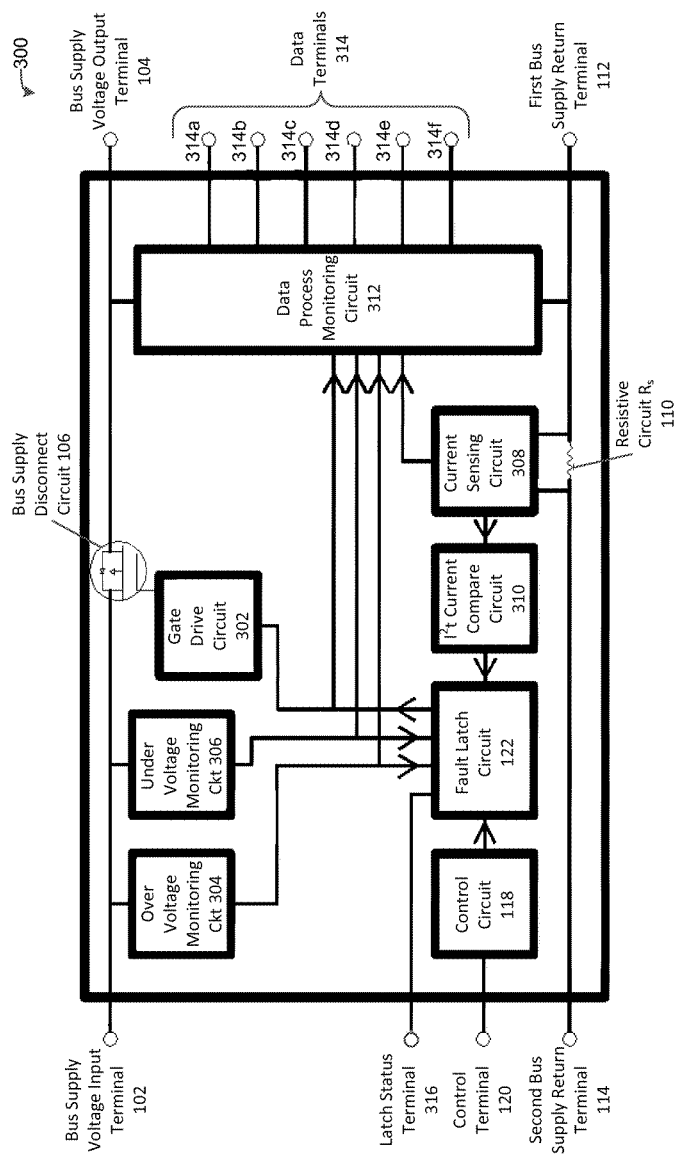
FIG. 3 is a device block diagram in accordance with another embodiment of the present invention.

Referring now to FIG. 3, a voltage bus protection and isolation device 300 in accordance with another embodiment of the present invention is shown. The device 300 includes a bus supply voltage input terminal 102, a bus supply voltage output terminal 104, a bus supply disconnect circuit 106 connected between the bus supply voltage input terminal 102 and the bus supply voltage output terminal 104, a gate drive circuit 302 connected to the supply bus disconnect circuit 106, an over voltage monitoring circuit 304 connected to the bus supply voltage input terminal 102, an under voltage monitoring circuit 306 connected to the bus supply voltage input terminal 102, a resistive circuit 110 connected between a first bus supply return terminal 112 and a second bus supply return terminal 114, a current sensing circuit 308 connected to the resistive circuit 110, a current squared time ($I^2t$) comparison circuit 310 connected to the current sensing circuit 308, a control circuit 118 connected to a control terminal 120, a fault latch circuit 122 and a data process monitoring circuit 312. The fault latch circuit 122 is connected to the over voltage monitoring circuit 304, the under voltage monitoring circuit 306, the gate drive circuit 302, the current squared time ($I^2t$) comparison circuit 310 and the control circuit 118.

The fault latch circuit 122: (a) turns the bus supply disconnect circuit 106 "OFF" via the gate drive circuit 302 thereby isolating the bus supply voltage input terminal 102 from the bus supply voltage output terminal 104 whenever the over voltage monitoring circuit 304 detects an over voltage condition, the under voltage monitoring circuit 306 detects an under voltage condition, the current squared time ($I^2t$) comparison circuit 310 detects an overload condition or an "OFF" signal is received from the control circuit 118, and (b) turns the bus supply disconnect circuit 106 "ON" via the gate drive circuit 302 thereby connecting the bus supply voltage input terminal 102 to the bus supply voltage output terminal 104 whenever an "ON" signal is received from the control circuit 118. The control circuit 118 may also automatically send the "ON" signal to the fault latch circuit 122 after a time delay from the gate drive circuit 302 turning the bus supply disconnect circuit 106 "OFF" in response to the over voltage condition, the under voltage condition, or the overload condition. One or more parameters defining at least one of the over voltage condition, the under voltage condition, or the overload condition may be programmable. The device may also include a latch status terminal 316 connected to the fault latch circuit 122.

The data process monitoring circuit 312 is connected to the over voltage monitoring circuit 304, the under voltage monitoring circuit 306, the fault latch circuit 122, the current sensing circuit 308, the bus supply voltage output terminal 104, the second bus supply return terminal 112 and one or more data terminals 314. The one or more data terminals 314 may include at least one of an over voltage status terminal 314a, an under voltage status terminal 314b, a bus supply voltage good terminal 314c, a load current terminal 314d, a load voltage terminal 314e, or any other desired condition status terminal 314f.

The over voltage monitoring circuit 304 monitors an input supply voltage and detects the over voltage condition by comparing the input supply voltage to an over voltage set value. The under voltage monitoring circuit 306 monitors the input supply voltage and detects the under voltage condition by comparing the input supply voltage to an under voltage set value. The over voltage set value and the under voltage set value may also be programmable.

The current sensing circuit 308 detects a current using the resistive circuit 110, and provides a voltage signal proportional to a current squared time ($I^2t$) value to the current squared time ($I^2t$) comparison circuit 310. The current squared time ($I^2t$) comparison circuit 310 detects the overload condition by comparing the voltage signal to one or more preset values with or without a time delay. The one or more preset values and the time delay may also programmable.

The operation of one embodiment of the present invention will now be described in more detail. The bus supply voltage input is applied between terminals 102 and 114. The bus supply voltage output is delivered between terminals 104 and 112. The supply bus input power delivered to the device supply voltage output terminal 104 is determined by input supply bus voltage and current. In the event the input power set point is exceeded the fault latch circuit 122 may actuate causing the gate drive circuit 302 to turn off the bus supply pass element 106.

Input over voltage monitoring circuitry 304 monitors the input bus supply voltage 102 for actual bus voltage value and compares the actual bus voltage value to the over voltage set value. In the event of an over voltage occurrence the over voltage monitoring circuitry 304 may actuate the fault latch circuit 122 which may cause the gate drive circuit 302 to turn off the bus supply pass element 106. The fault latch 122 may be reset to continue bus supply operation by actuation of the control circuit 118.

Input under voltage monitoring circuitry 306 monitors the input bus supply voltage 102 for actual bus voltage value and compares the actual bus voltage value to the under voltage set value. In the event of an under voltage occurrence the under voltage monitoring circuitry 306 may actuate the fault latch circuit 122 which may cause the gate drive circuit 302 to turn off the bus supply pass element 106. The fault latch 122 may be reset to continue bus supply operation by actuation of the control circuit 118.

The control circuitry 118 makes available external operating control to the device for off-to-on, on-to-off, and fault latch reset functionality. The control operates from TTL or CMOS digital command signals.

The fault latch circuitry 122 is central to fault detection and actuation. The fault latch 122 receives input from a minimum of four integrated functions: (1) control circuit 118, (2) over voltage monitoring circuit 304, (3) under voltage monitoring circuit 306, and (4) $I^2t$ current comparator 310. Outputs of the fault latch circuit 122 may cause the gate drive circuit 302 to turn off the bus supply pass element 106. The fault latch circuit 122 may be reset to continue bus supply operation by actuation of the control circuit 118.

The fault latch circuitry 122 may provide an automatic imposed re-start function on a fault actuation after some time delay. Independent of the source of the fault, input side fault or load side fault described herein, the re-started function may actuate after some time delay. The re-start function cycle will continue until commanded "OFF" by the control circuit 118.

The current sensing circuit or amplifier 308 senses the current differentially across $R_S$ 110, flowing in the return path between input 114 and output 112 terminals of the device. The current sensing circuit or amplifier 308 inputs a voltage signal proportional to the current flowing through $R_S$ to the $I^2t$ current comparator 310. The comparator 310 monitors the current level flowing through $R_S$. If the current is below a preset level, no action will be taken by the fault latch circuit 122. If the current flowing in $R_S$ exceeds the preset level, the fault latch circuit 122 may actuate sending a command signal to the gate drive circuit 302, thus turning off the bus supply pass element 106.

The $I^2t$ current comparator circuit 310 monitors the current flowing through $R_S$ 110 determining the existence of an over load condition on the device output terminals 104 and 112. When present, an over load condition may cause the $I^2t$ current comparator circuit 310 to actuate after some time delay following the onset of the over load condition. At the point where the ht current comparator circuit 310 switches the fault latch circuit 122. The fault latch circuit 122 may actuate to send a command signal to the gate drive circuit 302, turning off the bus supply pass element 106.

The $I^2t$ current comparator circuit 310 monitors the current flowing through $R_S$ 110 determining the existence of a shorted load condition on the device output terminals 104 and 112. When present, a shorted load condition may cause the $I^2t$ current comparator circuit 310 to actuate instantaneously with minimal delay following the onset of the shorted load condition. At the point when $I^2t$ current comparator circuit 310 switches, the fault latch circuit 122 may actuate and send a command signal to the gate drive circuit 302, turning off the bus supply pass element 106.

The data process monitor circuit or processor 312 accepts inputs from the following functional circuits: (1) over voltage monitoring circuit 304, (2) under voltage monitoring circuit 306, (3) fault latch circuit 122, and (4) current sense amplifier 308. The data process monitor circuit 312 continuously superintends the operational state of the electronic bus protection device and may make available at the device output terminals the following status or data: (1) over voltage status 314a, (2) under voltage status 314b, (3) bus supply voltage good status 314c, (4) load current data 314d, (5) load voltage data 314e, and (6) other data or status condition that may be determined from available inputs 314f. The over voltage status 314a reflects the condition of the bus supply voltage input to be above a preset threshold level. The under voltage status 314b reflects the condition of the bus supply voltage input to be below a preset threshold level. The bus supply voltage good status 314c indicates the operational state of the device. This status signal indicates the device is "ON" in normal operation, or in an "OFF" condition due to a Control OFF command, or a fault condition. The load current 314d provides a scaled representation of the load current flowing through $R_S$ 110. The load voltage 314e provides a scaled representation of the load voltage. Other data or status 314f may include signal, status, control status, or other machine states of the electronic bus protection device. The output status and signals provided by data process monitor circuit 312 may be presented as digital logic, analog signals, formatted bit stream data, or a combination of each communication technology. In other words, the one or more data terminals 314 can be any type of analog or digital communications interface. Moreover, the data process monitoring circuit 314 may include one or more device drivers to interface with one or more plug-and-play internal or external devices.

The components described herein can be disposed within an enclosure in which the terminals are accessible from an exterior of the enclosure. The terminals can be any type of individual connector or bus connector. The enclosure is encapsulated and may be suitable for extraterrestrial environments or extreme terrestrial environments.

All publications, patents and patent applications mentioned in the specification are indicative of the level of skill of those skilled in the art to which this invention pertains. All publications, patents and patent applications are herein incorporated by reference to the same extent as if each individual publication, patent or patent application was specifically and individually indicated to be incorporated by reference.

Terms such as "a", "an," and "the" are not intended to refer to only a singular entity, but include the general class of which a specific example may be used for illustration. In addition, the use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

It may be understood that particular embodiments described herein are shown by way of illustration and are not meant to limit the scope of the present invention in any manner. The principal features of this invention can be employed in various embodiments without departing from the scope of the invention. Those skilled in the art will recognize, or be able to ascertain using no more than routine experimentation, numerous equivalents, modifications and variants of the present invention are possible in light of the foregoing disclosure. Such equivalents, modifications and variants are considered to be within the scope of this invention and are covered by the claims.

What is claimed is:

1. A voltage bus protection and isolation device comprising:
    a bus supply voltage input terminal;
    a bus supply voltage output terminal;
    a bus supply disconnect circuit connected between the bus supply voltage input terminal and the bus supply voltage output terminal;
    a voltage monitoring circuit connected to the bus supply voltage input terminal;
    a resistive circuit connected between a first bus supply return terminal and a second bus supply return terminal;
    a current squared time ($I^2t$) monitoring circuit connected to the resistive circuit;
    a control circuit connected to a control terminal; and
    a fault latch circuit connected to the voltage monitoring circuit, the bus supply disconnect circuit, the current squared time ($I^2t$) monitoring circuit and the control circuit, wherein the fault latch circuit: (a) turns the bus supply disconnect circuit "OFF" thereby isolating the bus supply voltage input terminal from the bus supply voltage output terminal whenever the voltage monitoring circuit detects an over voltage condition, the voltage monitoring circuit detects an under voltage condition, the current squared time ($I^2t$) monitoring circuit detects an overload condition or an "OFF" signal is received from the control circuit, and (b) turns the bus supply disconnect circuit "ON" thereby connecting the bus supply voltage input terminal to the bus supply voltage output terminal whenever an "ON" signal is received from the control circuit.

2. The device as recited in claim 1, wherein the control circuit automatically sends the "ON" signal to the fault latch circuit after a time delay from the fault latch circuit turning the bus supply disconnect circuit "OFF" in response to the over voltage condition, the under voltage condition, or the overload condition.

3. The device as recited in claim 1, wherein the voltage monitoring circuit monitors an input supply voltage, detects the over voltage condition by comparing the input supply voltage to an over voltage set value, and detects the under voltage condition by comparing the input supply voltage to an under voltage set value.

4. The device as recited in claim 1, wherein the voltage monitoring circuit comprises an over voltage monitoring circuit and an under voltage monitoring circuit.

5. The device as recited in claim 4, wherein:
    the over voltage monitoring circuit monitors an input supply voltage and detects the over voltage condition by comparing the input supply voltage to an over voltage set value; and
    the under voltage monitoring circuit monitors the input supply voltage and detects the under voltage condition by comparing the input supply voltage to an under voltage set value.

6. The device as recited in claim 5, wherein the over voltage set value and the under voltage set value are programmable.

7. The device as recited in claim 1, wherein the current squared time ($I^2t$) monitoring circuit comprises:
    a current sensing circuit connected to the resistive circuit; and
    a current squared time ($I^2t$) comparison circuit connected to the current sensing circuit and the fault latch circuit.

8. The device as recited in claim 7, wherein:
the current sensing circuit detects a current using the resistive circuit, and provides a voltage signal proportional to a current squared time ($I^2t$) value to the current squared time ($I^2t$) comparison circuit; and
the current squared time ($I^2t$) comparison circuit detects the overload condition by comparing the voltage signal to one or more preset values with or without a time delay.

9. The device as recited in claim 8, wherein the one or more preset values and the time delay are programmable.

10. The device as recited in claim 1, further comprising:
a gate drive circuit connected between the fault latch circuit and the supply bus disconnect circuit; and
a latch status terminal connected to the fault latch circuit.

11. The device as recited in claim 1, further comprising a data process monitoring circuit connected to the voltage monitoring circuit, the fault latch circuit, the current squared time ($I^2t$) monitoring circuit, the bus supply voltage output terminal, the second bus supply return terminal and one or more data terminals.

12. The device as recited in claim 11, wherein the one or more data terminals comprise at least one of an over voltage status terminal, an under voltage status terminal, a bus supply voltage good terminal, a load current terminal, a load voltage terminal, or an other condition status terminal.

13. The device as recited in claim 1, wherein one or more parameters defining at least one of the over voltage condition, the under voltage condition, or the overload condition are programmable.

14. A voltage bus protection and isolation device comprising:
a bus supply voltage input terminal;
a bus supply voltage output terminal;
a bus supply disconnect circuit connected between the bus supply voltage input terminal and the bus supply voltage output terminal;
a gate drive circuit connected to the supply bus disconnect circuit;
an over voltage monitoring circuit connected to the bus supply voltage input terminal;
an under voltage monitoring circuit connected to the bus supply voltage input terminal;
a resistive circuit connected between a first bus supply return terminal and a second bus supply return terminal;
a current sensing circuit connected to the resistive circuit;
a current squared time ($I^2t$) comparison circuit connected to the current sensing circuit;
a control circuit connected to a control terminal;
a fault latch circuit connected to the over voltage monitoring circuit, the under voltage monitoring circuit, the gate drive circuit, the current squared time ($I^2t$) comparison circuit and the control circuit, wherein the fault latch circuit: (a) turns the bus supply disconnect circuit "OFF" via the gate drive circuit thereby isolating the bus supply voltage input terminal from the bus supply voltage output terminal whenever the over voltage monitoring circuit detects an over voltage condition, the under voltage monitoring circuit detects an under voltage condition, the current squared time ($I^2t$) comparison circuit detects an overload condition or an "OFF" signal is received from the control circuit, and (b) turns the bus supply disconnect circuit "ON" via the gate drive circuit thereby connecting the bus supply voltage input terminal to the bus supply voltage output terminal whenever an "ON" signal is received from the control circuit; and
a data process monitoring circuit connected to the over voltage monitoring circuit, the under voltage monitoring circuit, the fault latch circuit, the current sensing circuit, the bus supply voltage output terminal, the second bus supply return terminal and one or more data terminals.

15. The device as recited in claim 14, wherein the control circuit automatically sends the "ON" signal to the fault latch circuit after a time delay from the gate drive circuit turning the bus supply disconnect circuit "OFF" in response to the over voltage condition, the under voltage condition, or the overload condition.

16. The device as recited in claim 14, wherein:
the over voltage monitoring circuit monitors an input supply voltage and detects the over voltage condition by comparing the input supply voltage to an over voltage set value; and
the under voltage monitoring circuit monitors the input supply voltage and detects the under voltage condition by comparing the input supply voltage to an under voltage set value.

17. The device as recited in claim 16, wherein the over voltage set value and the under voltage set value are programmable.

18. The device as recited in claim 14, wherein:
the current sensing circuit detects a current using the resistive circuit, and provides a voltage signal proportional to a current squared time ($I^2t$) value to the current squared time ($I^2t$) comparison circuit; and
the current squared time ($I^2t$) comparison circuit detects the overload condition by comparing the voltage signal to one or more preset values with or without a time delay.

19. The device as recited in claim 18, wherein the one or more preset values and the time delay are programmable.

20. The device as recited in claim 14, further comprising a latch status terminal connected to the fault latch circuit.

21. The device as recited in claim 14, wherein the one or more data terminals comprise at least one of an over voltage status terminal, an under voltage status terminal, a bus supply voltage good terminal, a load current terminal, a load voltage terminal, or an other condition status terminal.

22. The device as recited in claim 14, wherein one or more parameters defining at least one of the over voltage condition, the under voltage condition, or the overload condition are programmable.

23. A method for protecting and isolating a voltage bus comprising the steps of:
providing a device comprising a bus supply voltage input terminal, a bus supply voltage output terminal, a bus supply disconnect circuit connected between the bus supply voltage input terminal and the bus supply voltage output terminal, a voltage monitoring circuit connected to the bus supply voltage input terminal, a resistive circuit connected between a first bus supply return terminal and a second bus supply return terminal, a current squared time ($I^2t$) monitoring circuit connected to the resistive circuit, a control circuit connected to a control terminal, and a fault latch circuit connected to the voltage monitoring circuit, the bus supply disconnect circuit, the current squared time ($I^2t$) monitoring circuit and the control circuit;
measuring an input supply voltage using the voltage monitoring circuit;

measuring a current squared time ($I^2t$) value based on a current across the resistive circuit using current squared time ($I^2t$) monitoring circuit;

automatically turning the bus supply disconnect circuit "OFF" using the fault latch circuit thereby isolating the bus supply voltage input terminal from the bus supply voltage output terminal whenever the voltage monitoring circuit detects an over voltage condition, the voltage monitoring circuit detects an under voltage condition, the current squared time ($I^2t$) monitoring circuit detects an overload condition or an "OFF" signal is received from the control circuit; and automatically turning the bus supply disconnect circuit "ON" using the fault latch circuit thereby connecting the bus supply voltage input terminal to the bus supply voltage output terminal whenever an "ON" signal is received from the control circuit.

24. The method as recited in claim 23, further comprising the step of automatically sending the "ON" signal to the fault latch circuit from the control circuit after a time delay from the fault latch circuit turning the bus supply disconnect circuit "OFF" in response to the over voltage condition, the under voltage condition, or the overload condition.

25. The method as recited in claim 23, wherein the voltage monitoring circuit detects the over voltage condition by comparing the input supply voltage to an over voltage set value, and detects the under voltage condition by comparing the input supply voltage to an under voltage set value.

26. The method as recited in claim 23, wherein:
the voltage monitoring circuit comprises an over voltage monitoring circuit and an under voltage monitoring circuit;
the over voltage monitoring circuit monitors the input supply voltage and detects the over voltage condition by comparing the input supply voltage to an over voltage set value; and
the under voltage monitoring circuit monitors the input supply voltage and detects the under voltage condition by comparing the input supply voltage to an under voltage set value.

27. The method as recited in claim 23, wherein:
the current squared time ($I^2t$) monitoring circuit comprises a current sensing circuit connected to the resistive circuit, and a current squared time ($I^2t$) comparison circuit connected to the current sensing circuit and the fault latch circuit;
the current sensing circuit detects the current using the resistive circuit, and provides a voltage signal proportional to a current squared time ($I^2t$) value to the current squared time ($I^2t$) comparison circuit; and
the current squared time ($I^2t$) comparison circuit detects the overload condition by comparing the voltage signal to one or more preset values with or without a time delay.

28. The method as recited in claim 23, further comprising the step of programming one or more parameters defining at least one of the over voltage condition, the under voltage condition, or the overload condition.

* * * * *